United States Patent
Pandey et al.

(10) Patent No.: US 9,344,373 B2
(45) Date of Patent: May 17, 2016

(54) PACKET I/O SUPPORT FOR A LOGICAL SWITCH ROUTER ARCHITECTURE

(71) Applicant: International Business Machines Corporation, Armonk, NY (US)

(72) Inventors: Vijoy A. Pandey, San Jose, CA (US); Daljeet Singh, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 14/304,379

(22) Filed: Jun. 13, 2014

(65) Prior Publication Data
US 2015/0365330 A1  Dec. 17, 2015

(51) Int. Cl.
*H04L 12/773* (2013.01)
*H04L 12/851* (2013.01)
*H04L 12/947* (2013.01)
*H04L 12/46* (2006.01)

(52) U.S. Cl.
CPC ........ *H04L 47/2441* (2013.01); *H04L 12/4641* (2013.01); *H04L 45/60* (2013.01); *H04L 49/25* (2013.01)

(58) Field of Classification Search
None
See application file for complete search history.

(56) References Cited

U.S. PATENT DOCUMENTS

| 2007/0083924 | A1 | 4/2007 | Lu | |
|---|---|---|---|---|
| 2009/0216898 | A1* | 8/2009 | Meng et al. | 709/232 |
| 2013/0039366 | A1* | 2/2013 | Goyal et al. | 370/392 |
| 2015/0055468 | A1* | 2/2015 | Agarwal et al. | 370/232 |
| 2015/0139225 | A1* | 5/2015 | Thubert et al. | 370/390 |

FOREIGN PATENT DOCUMENTS

WO  2012021717 A1  2/2012

OTHER PUBLICATIONS

Mizrahi et al., "The OAM Jigsaw Puzzle", Marvell, White Paper, Apr. 2011, <marvell.com>.

* cited by examiner

*Primary Examiner* — Chi H Pham
*Assistant Examiner* — Shick Hom
(74) *Attorney, Agent, or Firm* — Maeve M. Carpenter

(57) ABSTRACT

A tool for packet transmission and delivery in a distributed system. The tool determines one or more packets is classified as a L3 packet. The tool determines translation of the one or more packets classified as L3 packets to one or more corresponding net devices. The tool sends the one or more packets classified as a non L3 packet to a user space packet dispatcher service.

12 Claims, 4 Drawing Sheets

PACKET I/O SUPPORT FOR A LOGICAL SWITCH ROUTER ARCHITECTURE

FIELD OF THE INVENTION

The present invention relates generally to network virtualization, and more particularly to packet I/O support for a logical switch router (LSR) architecture.

BACKGROUND OF THE INVENTION

In computing, network virtualization is a method used to combine hardware and software network resources and network functionality into a single, software based administrative platform, known as a virtual network. Network virtualization is achieved through software and services that allow the sharing of storage, bandwidth, applications, and other network resources. The technology utilizes a method similar to the virtualization process used to simulate virtual machines within physical computers (i.e., server virtualization). A virtual network treats all hardware and software in the network as a single collection of resources, which can be accessed regardless of physical boundaries. In simple terms, network virtualization allows each authorized user to share network resources from a single computer.

Network virtualization facilitates customization and ease of network use. Virtualization can provide customized access that allows administrators to allocate critical network services, such as bandwidth throttling and quality of service (QoS). It can also provide consolidation by allowing a multitude of physical networks to be combined into a single virtual network, allowing for streamlined and simplified management.

Packet I/O is a software mechanism used by switching and routing protocols for sending and receiving control traffic, as well as a plurality of utilities and network diagnostics. Packet I/O provides protocol services and other applications, such as ping, traceroute, etc., with a consistent and efficient mechanism for reliable packet transmission and delivery. All routing protocols rely on packet I/O infrastructure for building network state, as well as for propagating updates to their peers in the network.

SUMMARY

Aspects of the present invention disclose a method, system, and computer program product for packet transmission and delivery in a distributed system. The method includes determining one or more packets is classified as a L3 packet. The method includes determining translation of the one or more packets classified as L3 packets to one or more corresponding net devices. The method includes sending the one or more packets classified as a non L3 packet to a user space packet dispatcher service

DETAILED DESCRIPTION

Figure 1:
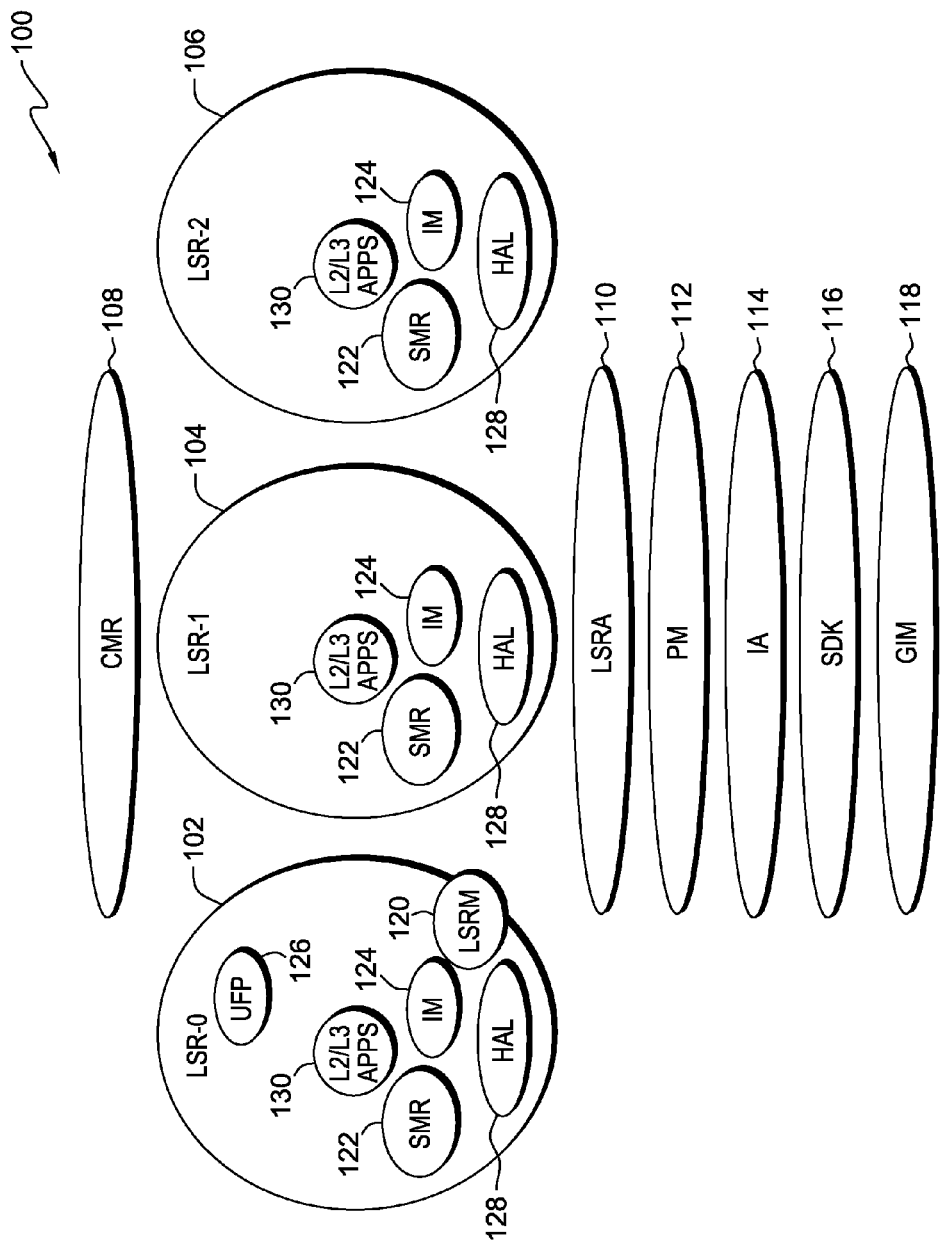
FIG. 1 illustrates a logical switch router (LSR) architecture within a data processing system, generally designated 100, in accordance with an embodiment of the present invention.

Embodiments of the present invention provide the capability to send and receive control, management, and network traffic in a LSR system through a flexible and efficient mechanism that minimizes packet copy for both Tx and Rx data paths, provides clear separation of platform dependent and platform independent functionality, and supports packet classification filters allowing applications to specify the types of packets to receive or transmit, based, at least in part, on dynamic registration of the packet API.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to Figures. FIG. 1 illustrates a logical switch router (LSR) architecture within a data processing system, generally designated 100, including a default logical switch router (LSR-0) 102, multiple non-default logical switch routers (LSR-1, LSR-2, etc.), such as LSR-1 104 and LSR-2 106, a configuration, management, and reporting client (CMR) 108, a logical switch router agent (LSRA) 110, a port manager (PM) 112, an interface agent (IA) 114, a software development kit (SDK) 116, a global index manager (GIM) 118, and a logical switch router manager (LSRM) 120.

In the exemplary embodiment, LSR-0 102 is an administrative logical switch router initially created by the networking system. LSR-0 102 cannot be deleted, and is responsible for managing non-default logical switch routers, such as LSR-1 104 and LSR-2 106. In the exemplary embodiment, the LSR environment is port/virtual port (vport) based, such that each port/vport can belong to only one LSR. All physical ports belong to LSR-0 102 until assigned to one or more non-default logical switch routers, such as LSR-1 104 and LSR-2 106. Initially, vports will not be present in the LSR environment. Vports are created by user configuration or via protocol negotiation.

In the exemplary embodiment, LSR-0 102 includes LSRM 120, a key process, operating on the master (as well as the backup) switch, responsible for LSR management, including hardware resource (e.g., port) assignment and management, a service manager (SMR) 122, a software module responsible for the launch and monitoring of software processes, CMR 108, a command line interface responsible for user management of LSRs and processing user requests, an interface manager (IM) 124, a universal fiber port (UFP) 126, a hardware abstraction layer (HAL) 128, and L2 and L3 level applications (apps) 130. On the data plane, there is no direct communication between two LSRs on the same switch. Communication between two LSRs on the same switch is possible through external connectivity.

In the exemplary embodiment, SMR 122 is one instance per LSR. SMR 122 launches all software processes with each LSR via a configuration file associated with each process (e.g., application). In each LSR, processes can be launched automatically or launched by user configuration, i.e., CMR 108 signals SMR 122 when a user request is issued. SMR 122 launches processes as defined by the configuration file associated with the process. For example, if a process is implemented in a distributed way, and is launched per user configuration, SMR 122 sends the request to all other switches to launch the process in a particular LSR. Policies for monitoring and restart are defined per process.

In the exemplary embodiment, IM 124 is a software module capable of handling logical interface (LIF) related management. A LIF can represent a physical interface, a virtual interface, a port-channel, arouted virtual interface (RVI), a loopback, etc. A LIF database in shared memory (not shown) is maintained in IM 124. In the exemplary embodiment, one instance of IM 124 operates within each LSR in the LSR environment.

In the exemplary embodiment, UFP 126 is a universal arbitrated fiber port used to communicate with and connect to ports or other devices included within a LSR system.

In the exemplary embodiment, HAL 128 is a software module responsible for hardware programming in the LSR environment. HAL 128 includes a set of routines that emulate platform specific details that provide other software modules and applications access to hardware resources.

In the exemplary embodiment, L2 and L3 applications (apps) 130 include a plurality of L2 and L3 level applications that support graceful shutdown (i.e., all resources are freed, such as those indices allocated through GIM 118, and the hardware resources underpinning the control, data, and management planes are cleaned up before the application terminates). Apps 130 support a restart capability to provide high availability (HA) functionality (i.e., capability to back up and restart if failure occurs).

LSR-1 104 and LSR-2 106 are non-default LSRs created by a default LSR, such as LSR-0 102.

In the exemplary embodiment, the LSR environment includes hardware support (e.g., VRF, LN support on FDB, etc.) for traffic isolation between different LSRs on the data plane.

LSRA 110 is a software component functioning as an agent of LSRM 120 on every switch. LSRA 110 is a global process responsible for the set up of the LSR environment on the control plane (such as jail and network namespace) of each switch. In the exemplary embodiment, LSRA 110 launches SMR 122 for each LSR, once the LSR is created.

PM 112 is a software module responsible for port management. PM 112 manages physical port and virtual port (i.e., channel) assignment in the LSR environment. A port database in shared memory (not shown) is maintained in PM 112. PM 112 is responsible for index assignment for hardware resources, such as LAG, multicast, spanning-tree-instance, etc., and is also responsible for enforcement of hardware resource policies for each LSR, such as LSR-1 104 and LSR-2 106. PM 112 is a global process with each switch having only one instance of PM 112 operating on it.

IA 114 is a software module responsible for managing mapping between logical interfaces (LIFs) and hardware ports. IA 114 is a global process with each switch having only one instance of IA 114 operating on it.

SDK 116 is a software module responsible for software development of the network chips in the LSR environment. SDK 116 is a global process with each switch having only one instance of SDK 116 operating on it.

GIM 118 is a software module responsible for index assignment for hardware resources such as LAG, multicast, spanning-tree-instance, etc. GIM 118 manages enforcement of hardware resource polices for one or more LSRs in the LSR system. GIM 118 is a global process with each switch having only one instance of GIM 118 operating on it.

LSR-0 102, LSR-1 104, and LSR-2 106 include multiple processes operating locally on each LSR.

Figure 2:
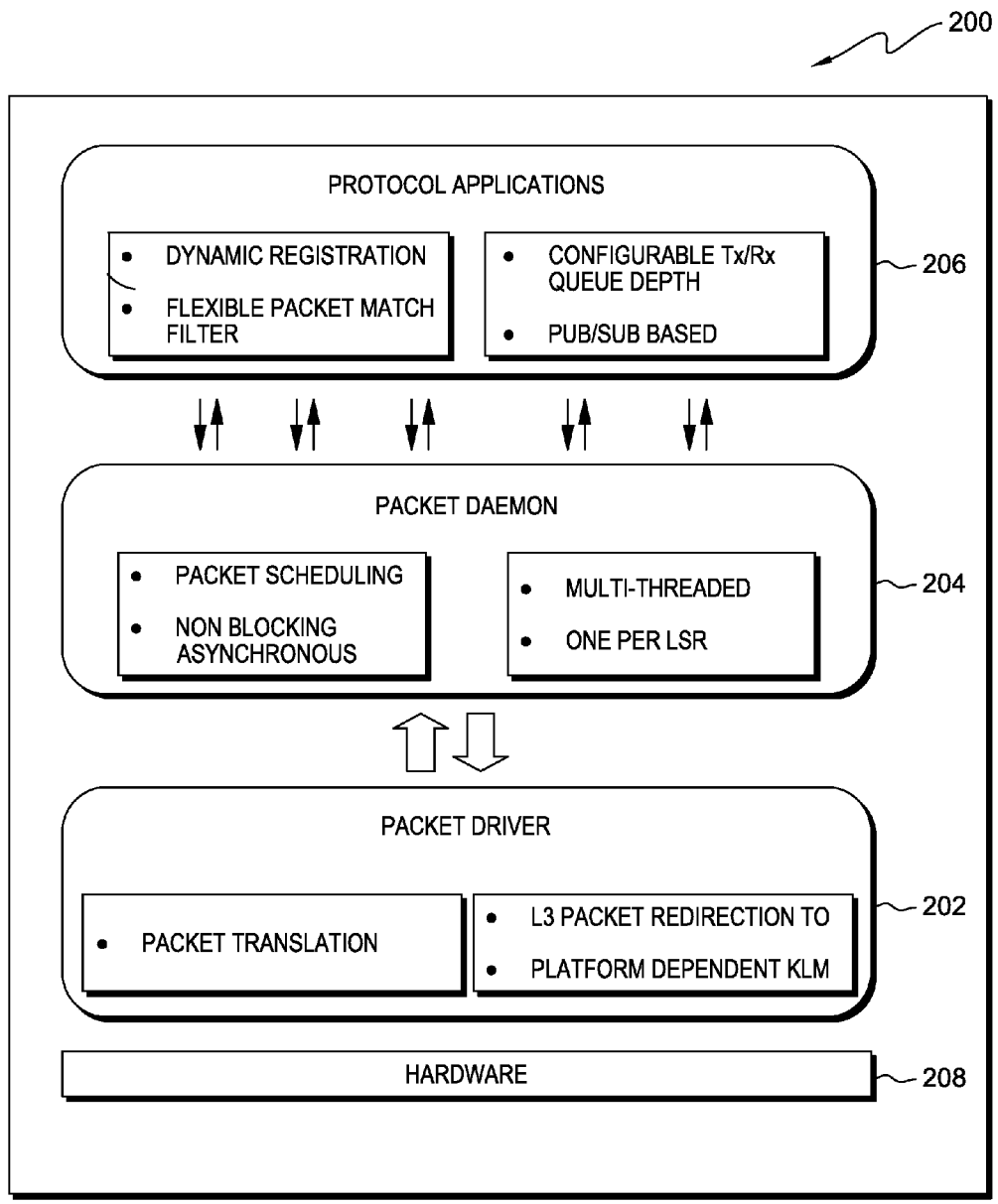
FIG. 2 is a functional block diagram illustrating a three tiered layered architecture for packet I/O in a LSR system, in accordance with an embodiment of the present invention.

FIG. 2 is functional block diagram, generally designated 200, illustrating a three tiered layered architecture for packet I/O in a LSR system, including a packet driver 202, a packet daemon 204, a protocol applications 206, and hardware 208, in accordance with an embodiment of the present invention.

In the exemplary embodiment, packet driver 202 is a software module responsible for first level packet classification, i.e., performing L2 classification to determine whether the packet is classified as L2 packets or L3 packets, i.e., whether the packet next hop is to a packet daemon 204 or, for example, a Linux L3 stack (i.e., platform dependent), packet translation, and L3 packet redirection to Linux. In the exemplary embodiment, packet driver 202, operating in an LSR environment, operates as a kernel loadable module. In another embodiment, packet driver 202 can be a virtual NIC or an SDK driver in a chassis system. In the exemplary embodiment, packet driver 202 determines LSR classification for packets classified as L2 packets and packets classified as L3 packets. In another embodiment, packet driver 202 may perform minimal metadata classification, such as LIF, VLAN, LAG-ID, etc. In the exemplary embodiment, packet driver 202 tags a plurality of information with respective packets to avoid reclassification in upper levels, such as packet daemon 204 and protocol applications 206.

In the exemplary embodiment, packet daemon 204 is a software module responsible for second level packet classification, based, at least in part, on registered client filters, i.e., performing packet classification by filtering packets through a client packet library, matching packet protocol header fields and packet metadata to pre-configured criteria. In the exemplary embodiment, a dedicated instance of packet daemon 204 per LSR in an LSR environment operates to minimize service disruption. In the exemplary embodiment, packet daemon 204 includes a registration API for protocol applications 206 to dynamically register applications for specific packets, based, at least in part, on the client packet library. The registration API provides match criteria based, at least in part, on packet protocol header fields and packet metadata, such as input interfaces, specific CPU redirect codes, and platform supported reason codes (CPU trap codes), etc. In another embodiment, packet daemon 204 may perform platform specific translations with runtime binding during platform capability discovery. In the exemplary embodiment, packet daemon 204 dispatches packets to and from protocol applications 206 and packet driver 202, supporting maximum portability when switching platform drivers as the application packet handling code remains unaffected.

In the exemplary embodiment, protocol applications 206 is a software module, configurable to operate on Tx and Rx queue depths, capable of dynamically registering applications with packet daemon 204 and filtering incoming and outgoing packets, based, at least in part, on the client packet library. In the exemplary embodiment, protocol applications 206 registers applications in an LSR environment with the registration API, via a publication/subscription (pub/sub) mechanism to transmit and receive packets and publish packet events to registered applications. In the exemplary embodiment, protocol applications 206 include packet classification filters that allow applications to specify the type of packets the applications they are interested in receiving and transmitting. The packet classification filters provide the capability to avoid packet classification code proliferation by publishing a runtime packet API as opposed to a static application registration. In the exemplary embodiment, protocol applications 206 utilize shared memory for packet storage to avoid making packet copies on a process context switch. In the exemplary embodiment, protocol applications 206 utilize the client packet library to send and receive packets. The client packet library provides applications with methods for subscribing to packet types of the application's choice and abstracts out details relating to sending and receiving packets over NISC. In another embodiment, protocol applications 206 manage Rx/Tx queues in their respective application process space.

Figure 3:
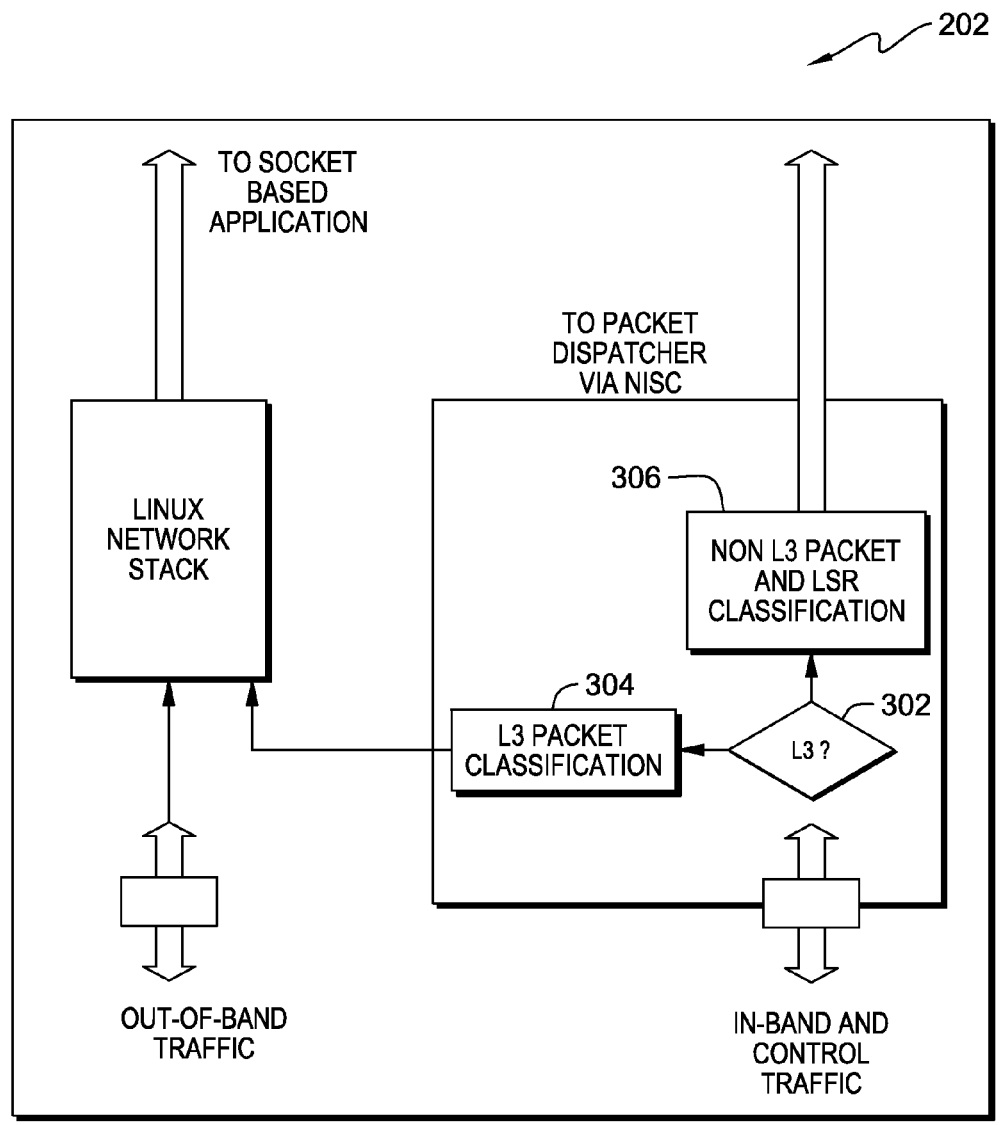
FIG. 3 is a functional block diagram illustrating packet classification in packet driver 202, in accordance with an embodiment of the present invention.

FIG. 3 is a functional block diagram illustrating packet classification in packet driver 202, in accordance with an embodiment of the present invention.

Packet driver 202 determines whether an incoming packet is classified as a L3 packet (step 302). In the exemplary embodiment, packet driver 202 determines whether the incoming packet is classified as a L3 packet based on common driver classification code inherent in the packet.

Where packet driver 202 determines that the incoming packet is classified as a L3 packet, packet driver 202 determines translation to corresponding Linux net device (LSR) and prepares the packet for net input (step 304). Packet driver 202 sends the packet to the Linux network stack for transmission to the corresponding Linux net device destination.

When packet driver 202 determines that the incoming packet is not classified as a L3 packet (i.e., packet classified as L2), packet driver 202 sends the packet to a user space packet dispatcher service (e.g., packet daemon 204) using a NISC pathway (step 306). Packet driver 202 sends the packet to the user space packet dispatcher service using packet metadata, such as data on a destination LSR, ingress LIF/LAN, etc. In another embodiment, packet driver 202 may rely on additional packet metadata, such as packet punt reasons and CPU trap codes depending on the platform used.

Figure 4:
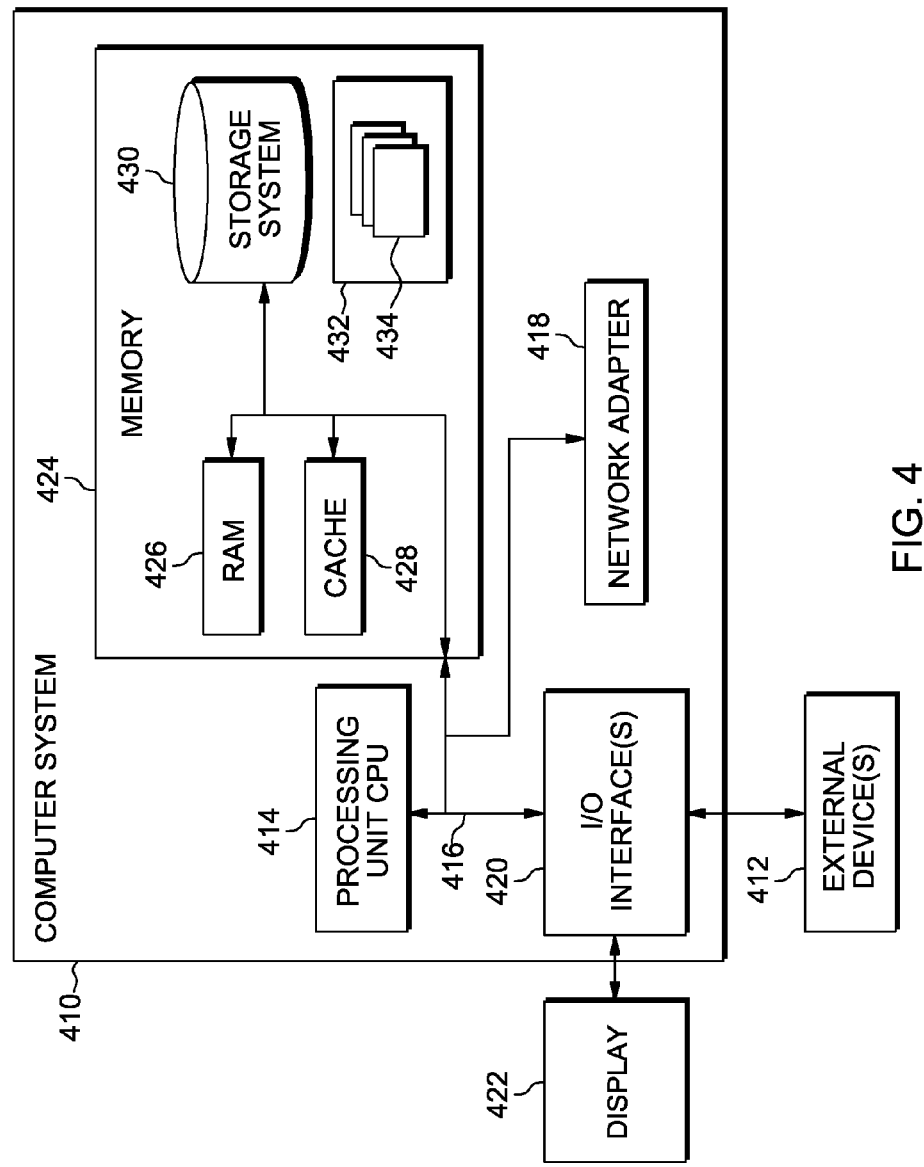
FIG. 4 depicts a block diagram of components of data processing system 100, in accordance with an illustrative embodiment of the present invention.

FIG. 4 depicts a block diagram of components of data processing system 100, in accordance with an illustrative embodiment of the present invention. It should be appreciated that FIG. 4 provides only an illustration of one implementation and does not imply any limitations with regard to the environments in that different embodiments may be implemented in. Many modifications to the depicted environment may be made.

Computer system 410 in data processing system 100 is shown in the form of a general-purpose computing device. The components of computer system 410 may include, but are not limited to, one or more processors or processing units 414, a system memory 424, and a bus 416 that couples various system components including system memory 424 to processor 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

System memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, system memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external devices 412 such as a keyboard, a pointing device, a display 422, etc. one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system having a logical switch architecture supporting a layered architecture for packet I/O in a distributed system, the computer system comprising:

one or more computer processors;

one or more computer readable hardware storage devices;

program instructions stored on the one or more computer readable storage devices for execution by at least one of the one or more computer processors, the program instructions comprising:

program instructions to determine a first level packet classification for one or more packets destined in the distributed system;

program instructions to determine a second level packet classification for the one or more packets in the distributed system, wherein the program instructions to determine the second level packet classification for the one or more packets in the distributed system comprise program instructions to filter the one or more packets in the distributed system through a client packet library to match a plurality of packet protocol header fields and a plurality of packet metadata to a plurality of pre-configured criteria included within the client packet library; and program instructions to register one or more applications included within one or more logical switch routers in the distributed system with a software module to filter the one or more packets in the distributed system.

2. The computer system of claim 1, wherein the program instructions to determine the first level packet classification for the one or more packets in the distributed system comprise program instructions to determine whether each of the one or more packets in the distributed system is a layer-3 (L3) packet or a non L3 packet.

3. The computer system of claim 2, wherein the program instructions to determine whether the one or more packets in the distributed system is a L3 packet or a non L3 packet further comprise one or more of the following:

program instructions to translate one or more L3 packets for one or more corresponding net devices;

program instructions to redirect the one or more L3 packets to the one or more corresponding net devices; or program instructions to prepare the one or more L3 packets for input.

4. The computer system of claim 2, wherein the program instructions to determine whether the one or more packets in the distributed system is a L3 packet or a non L3 packet comprise program instructions to send one or more non L3 packets to a user space packet dispatcher service.

5. The computer system of claim 1, wherein the program instructions to match the plurality of packet protocol header fields and the plurality of packet metadata to the plurality of pre-configured criteria included within the client packet library comprise program instructions to publish, based, at least in part, on determining one or more filter matches in the client packet library to the plurality of packet protocol header fields and the plurality of packet metadata to the plurality of pre-configured criteria, the one or more packets to the one or more client applications registered with the one or more filter matches in the client packet library.

6. The computer system of claim 1, wherein the program instructions to register the one or more client applications included within the one or more logical switch routers in the distributed system with a software module to filter the one or more packets in the distributed system comprise program instructions to subscribe the one or more client applications to the one or more packets in the distributed system for purposes of sending and receiving the one or more packets in the distributed system.

7. A method for packet transmission and delivery in a distributed system, the method comprising:

determining whether one or more packets is classified as a layer-3 (L3) packet, wherein determining whether the one or more packets is classified as a L3 packet includes determining whether one or more packets classifies as a L3 packet based, at least in part, on a common driver classification code inherent in the one or more packets;

determining a translation of one or more packets classified as L3 packets to one or more corresponding net devices; and sending one or more packets classified as non L3 packets to a user space packet dispatcher service.

8. The method of claim 7, further comprising sending the one or more packets classified as L3 packets to one or more network stacks for transmission to the one or more corresponding net devices.

9. The method of claim 7, wherein sending the one or more packets classified as non L3 packets to the user space dispatcher service, further comprises sending the one or more packets classified as non L3 packets based, at least in part, on packet metadata for the one or more packets classified as non L3 packets, the packet metadata including one or more of:

a destination logical switch router;

an ingress logical interface;

a packet punt reason; or a CPU trap code.

10. A computer program product for packet transmission and delivery in a distributed system, the computer program product comprising:

one or more computer-readable hardware storage devices and program instructions stored on the one or more computer-readable hardware storage devices, the stored program instructions comprising:

program instructions to determine whether one or more packets is classified as a layer-3 (L3) packet based, at least in part, on a common driver classification code inherent in the one or more packets;

program instructions to determine a translation of one or more packets classified as L3 packets to one or more corresponding net devices; and program instructions to send one or more packets classified as non L3 packets to a user space packet dispatcher service.

11. The computer program product of claim 10, wherein the stored program instructions further comprise program instructions to send the one or more packets classified as L3 packets to one or more network stacks for transmission to the one or more corresponding net devices.

12. The computer program product of claim 10, wherein the program instructions to send the one or more packets classified as non L3 packets to the user space dispatcher service further comprise program instructions to send the one or more packets classified as non L3 packets based, at least in part, on packet metadata for the one or more packets classified as non L3 packets, the packet metadata including one or more of:

a destination logical switch router;

an ingress logical interface;

a packet punt reason; or a CPU trap code.

* * * * *